Jan. 3, 1939.　　　　　C. E. KRAUS　　　　　2,142,517
METAL WORKING
Filed Dec. 21, 1936　　　　4 Sheets-Sheet 1
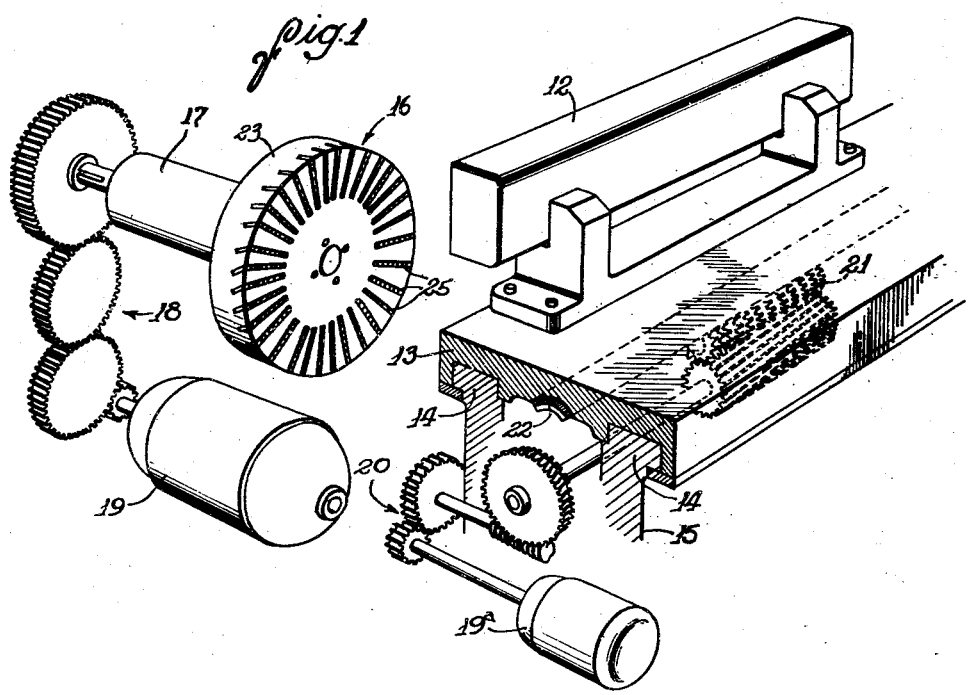
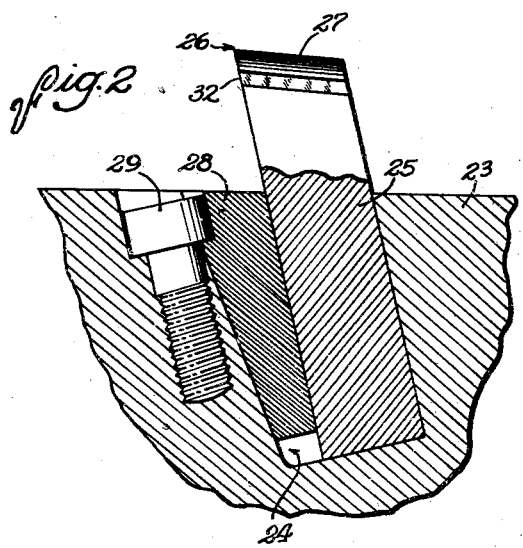
INVENTOR
Charles E. Kraus
By Parker, Carlson, Pitzner & Hubbard
ATTORNEYS Jan. 3, 1939.    C. E. KRAUS    2,142,517
METAL WORKING
Filed Dec. 21, 1936    4 Sheets-Sheet 2

INVENTOR
Charles E. Kraus
By Parker, Carlson, Pitzner & Hubbard
ATTORNEYS

Jan. 3, 1939.     C. E. KRAUS     2,142,517
METAL WORKING
Filed Dec. 21, 1936     4 Sheets-Sheet 3
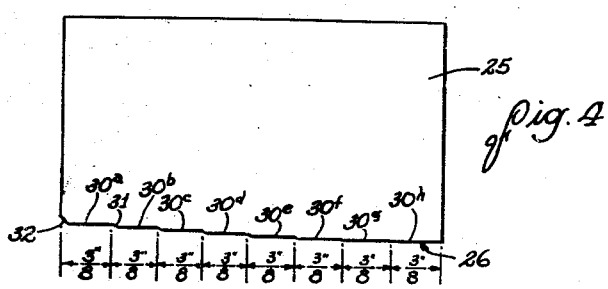
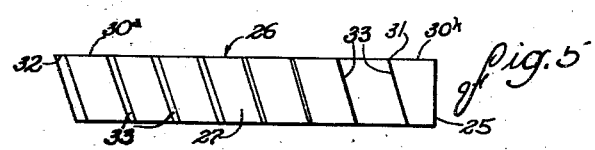
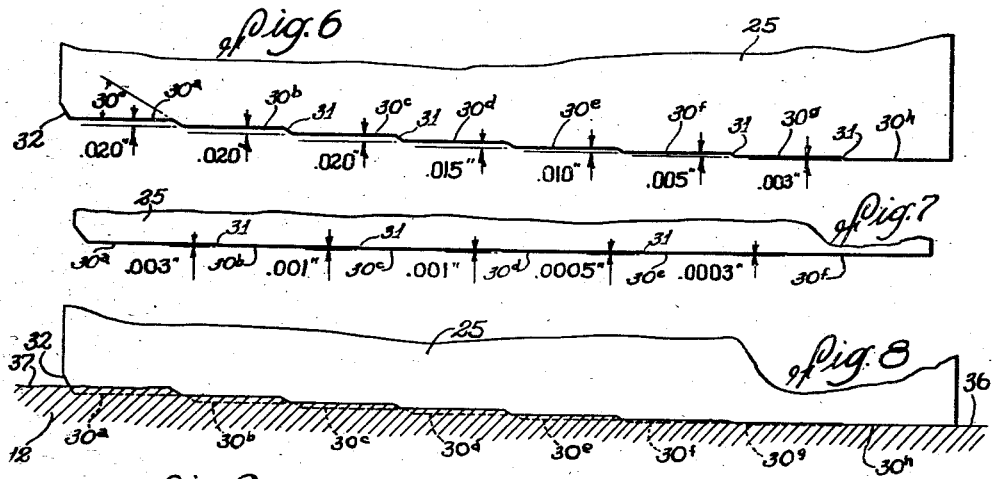
INVENTOR
Charles E. Kraus
By Parker, Carlson, Pitner & Hubbard
ATTORNEYS Jan. 3, 1939.  C. E. KRAUS  2,142,517
METAL WORKING
Filed Dec. 21, 1936  4 Sheets-Sheet 4
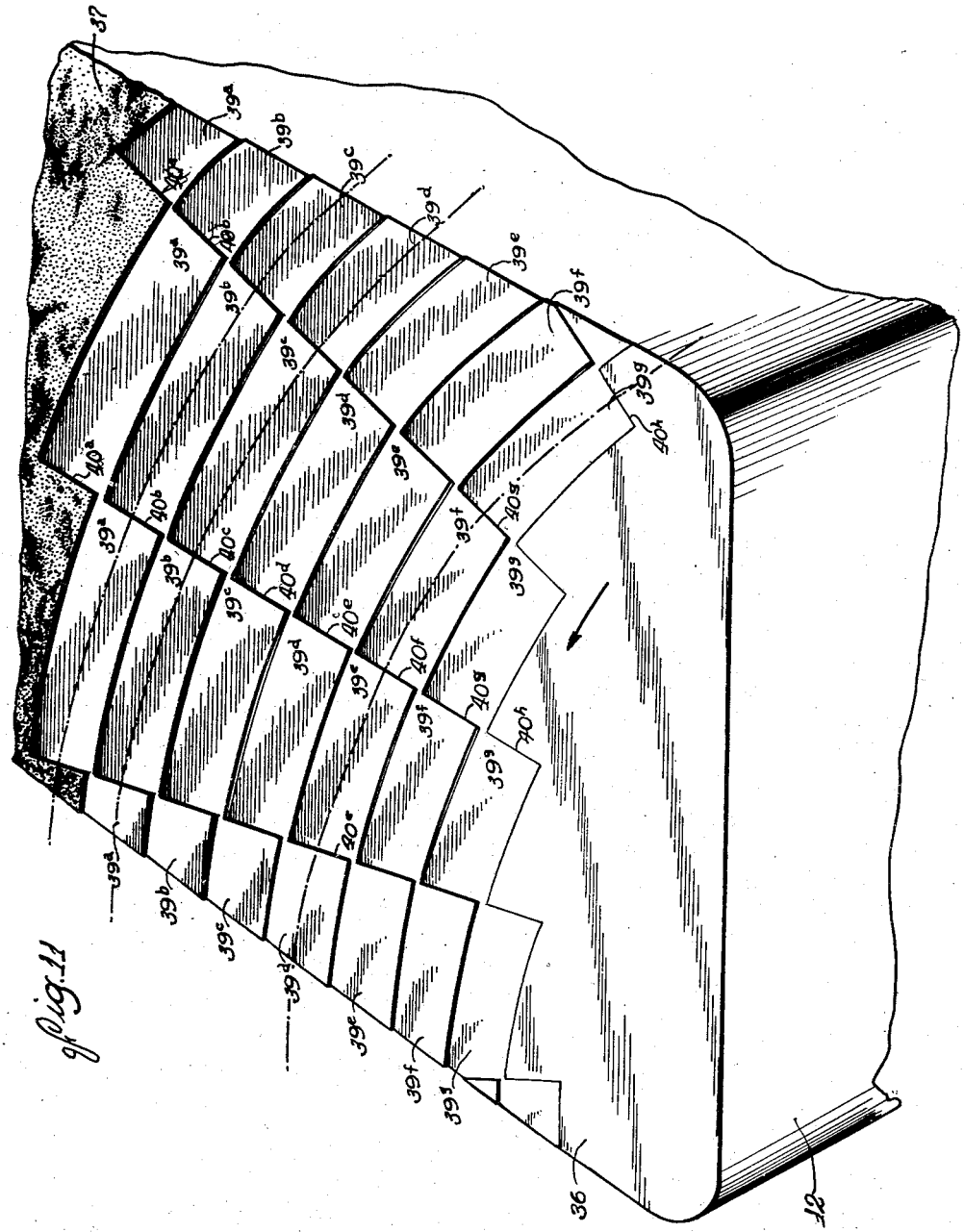
INVENTOR
Charles E. Kraus
By Parker, Carlson, Pitzner & Hubbard
ATTORNEYS Patented Jan. 3, 1939

2,142,517

UNITED STATES PATENT OFFICE 2,142,517

METAL WORKING

Charles Edward Kraus, Rockford, Ill., assignor to The Ingersoll Milling Machine Company, Rockford, Ill., a corporation of Illinois Application December 21, 1936, Serial No. 116,931

26 Claims. (Cl. 90—18)

This invention relates to the removal of layers of metal from work pieces to form smooth and accurately located surfaces and has more particular reference to the performance of face milling and analogous operations utilizing multiple blade rotary cutters. In such operations as now practiced, the active cutting edges are so shaped and positioned that the chip thickness is measured in the general direction of the feed between the cutter and the work and therefore varies with the speed of the cutter and the rate of feed; whereas the width of the chip is measured in a direction normal to the feed and is determined by the thickness of the metal layer to be removed from the work. Since the maximum permissible chip thickness, when not limited by finishing requirements, is determined largely by the character of the material of which the cutting edges are composed, a fixed limitation is imposed on the maximum rate at which metal may be removed by these processes as now practiced.

The problem of increasing feed rate obtainable in face milling operations and the like has been attacked from another angle. It has been proposed to eliminate the relationship above referred to between the rate of feed and the chip thickness by so arranging the cutting edges of the rotary cutter that the chip thickness is measured at right angles to that of the cutter feed and therefore remains constant as the feed is increased. This general process forms the subject matter of Patent No. 2,081,639.

The general object of the present invention is to improve upon the process last mentioned and provide a novel method and apparatus by which face milling and analogous operations may be carried out in practice at feed rates many times greater than the maximum now capable of being obtained in practice even when the most improved cutting materials are employed. In addition, the invention aims to produce smoother and more accurately formed surfaces in a single operation and to prolong the service life of the cutting material used.

A more detailed object is to provide an improved machine and method of the above character in which the combined length of the effective cutting edges may be increased to a maximum while providing ample chip clearance spaces, in which the torque on the cutter is substantially uniform for all angular positions, and which embodies cutting elements that may be manufactured at low cost and sharpened conveniently.

The invention also resides in the novel construction of the cutter and the blades thereof.

Other objects and advantages of the invention will become apparent from the following detailed description taken in connection with the accompanying drawings, in which Figure 1 is a perspective view partially in section showing the elements of a typical milling machine in which the present invention may be practiced.

Fig. 2 is a fragmentary cross sectional view through one of the cutter blades and its mounting.

Fig. 4 is an approximately actual size elevational view of one of the cutter blades.

Fig. 5 is an edge elevational view of the blade shown in Fig. 4.

Fig. 6 is an enlarged fragmentary elevational view of the edge portion of the blade shown in Fig. 4.

Fig. 7 is a view similar to Fig. 6 of a blade having a differently dimensioned cutting edge.

Fig. 8 is a sectional view of a work piece being operated upon by a blade shown on the same scale as in Fig. 6, the section being taken longitudinally of the blade.

Fig. 9 shows on the same scale as Figs. 6 and 8 the shape and arrangement of the chips removed by the blade shown in Fig. 6.

Fig. 10 is a view similar to Fig. 9 showing the shape and positions of the chips when a slower feed rate is employed.

Fig. 11 is a fragmentary view of a partially machined work piece.

Figure 3:
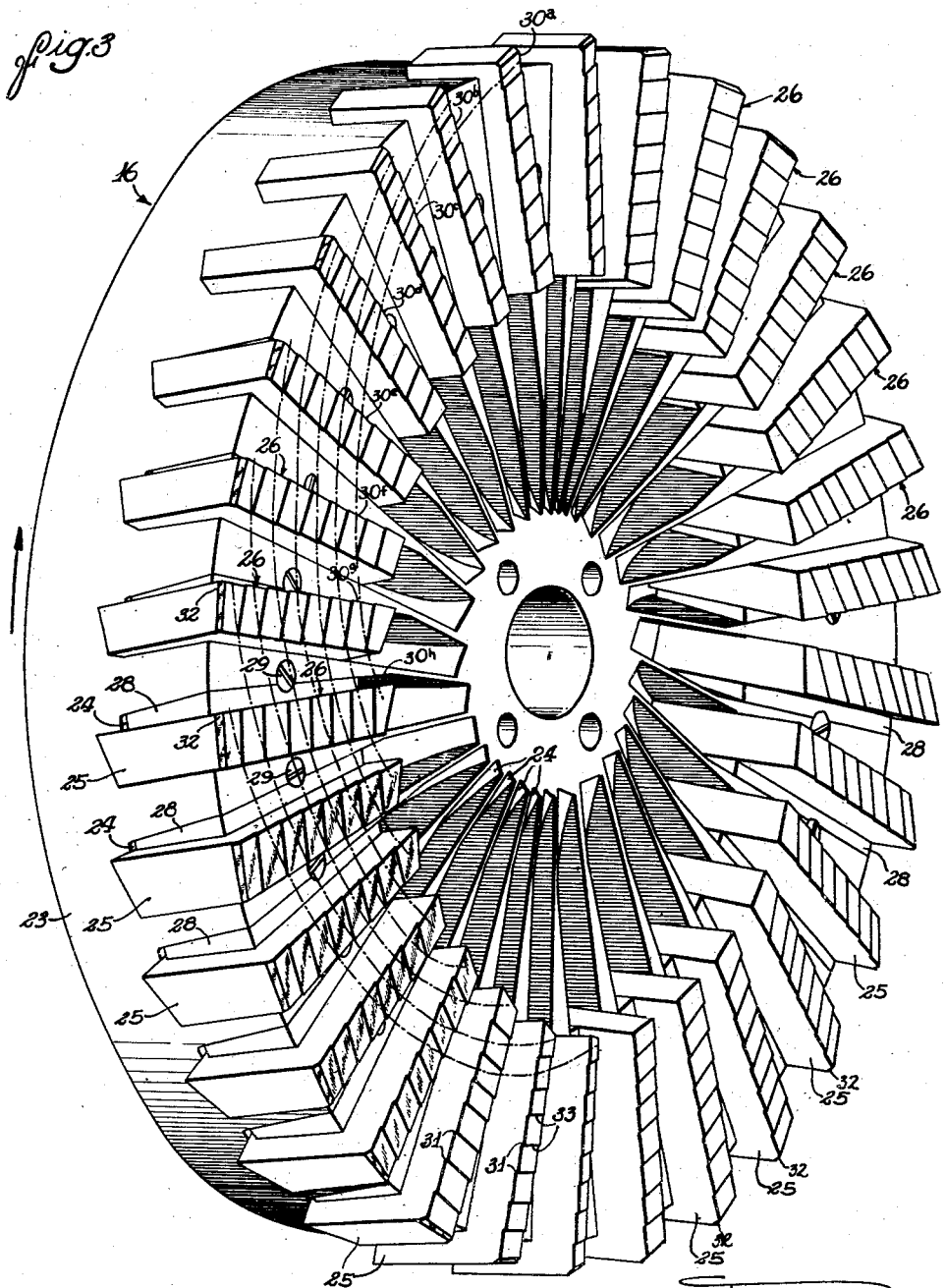
Fig. 3 is a perspective view of the cutter.

While the invention is susceptible of various modifications and alternative constructions, I have shown in the drawings and will herein describe in detail the preferred embodiment, but it is to be understood that I do not intend to limit the invention by such disclosure but aim to cover all modifications and alternative constructions falling within the spirit and scope of the invention as expressed in the appended claims.

Generally stated, the invention involves the use of a multiple blade rotary cutter having elongated cutting edges annularly arranged and generally parallel to the work surface to be formed and each divided lengthwise into a series, usually more than four, of edge portions progressively stepped extremely small distances (see Figs. 4 and 7) apart for engagement successively with the work and each having steps of lengths many times their individual height. The successive blades cooperate to form groups of cutting edges extending around the cutter axis spirally or helically according to the character of the metal removing operation to be performed. A large number, that is one for each blade, of such spiral groups of edges are thus provided, these being arranged in overlapping relation as indicated by the dot-dash lines in Fig. 3.

The improved method includes rotating the cutter with the stepped edge portions arranged as above described, positioning the work piece to be machined relative to the cutter with the edge portions or steps last to engage the work coinciding with the work surface to be formed, and finally relatively feeding the work and the cutter at a rate correlated with the length and height of the steps, the speed of the cutter, and the number of blades thereon. This rate is such that in the combined rotary and feeding movements, the adjacent overlapping spiral groups of steps traverse overlapping curved zones of the work and cut from each zone successive layers of metal extending parallel to the finished work surface which is formed by the last step, each of such layers being of a width in the direction of the feed several times the thickness of the layer due to the height of the individual step. To facilitate the formation of a smooth finished surface, the steps on each blade vary in height so that the layers of metal removed by the last acting steps are thinner than those cut by the steps which first engage the work.

By arranging the cutting edges in such a large number of spiral or helical groups spaced uniformly around the cutter and each overlapping several adjacent groups, the total number of individual steps acting and the amount of metal being removed at any time will remain constant resulting in a uniform torque on the cutter and efficient loading thereof. Formation of the edges of several different groups in longitudinal alinement on a single blade enables the aggregate length of active cutting edges to be increased to a maximum for a cutter of given diameter while at the same time providing proper clearance spaces between adjacent blades to accommodate the increased volume of chips. This arrangement also facilitates production of the blades at low cost and accurate grinding of the edges to form such fine steps with the required accuracy.

The invention is especially applicable to the performance of face milling operations and accordingly is shown in the drawings embodied in a typical form of milling machine that might be used for facing one side of a work piece 12. While being operated upon, the work is secured by suitable clamps upon a work support in the form of a table 13 slidable along ways 14 on a bed 15 so as to move the work across the face of a cutter 16. The latter is carried by a spindle 17 rotatably supported with the proper rigidity in the machine frame (not shown) and driven through suitable gearing 18 by power derived from an appropriate source such as an electric motor 19.

Relative feeding movement between the cutter and the work at the required rate later to be described may be effected and controlled in various ways well understood in the art. For example, power for reciprocating the table 13 may be derived from a reversible motor 19ª and transmitted through suitable speed reducing mechanism including gearing 20 to a screw 21 meshing with a rack 22 on the table.

As shown in Figs. 2 and 3, the cutter 16 comprises a generally cylindrical body 23 having relatively closely spaced slots 24 in one face extending radially or substantially so and inclined so as to provide the rake angle desired. The slots are spaced uniformly around the cutter face and receive unitary blades 25 each positioned with one end extending beyond the end of the slot and a side portion projecting from the face of the body. Herein each blade comprises a generally rectangular block of cutting material having an elongated continuous cutting edge 26 formed along the leading edge of an exposed surface 27 which is sloped away from the cutting edge to afford proper clearance.

The blades may be locked in the cutter body in various ways. In the present instance, each is clamped against the bottom and one side wall of the slot by an inwardly tapering wedge 28 received between the blade and the opposite wall of the slot and held in wedged position by a screw 29 threading into the body with its head overlying the wedge.

As contemplated by the present invention, the cutting edge 26 of each blade is divided longitudinally into a relatively large number, eight in the present instance, of edge portions or steps 30 individually identified by letters. Preferably, the steps are of equal length, substantially straight throughout their lengths and disposed parallel to each other. The adjacent ends of the adjacent steps are joined by a plurality of short intervening transverse edge portions 31 preferably rounded or inclined as shown at a relatively small angle, for example 30 degrees, to the steps 30 so as to avoid the formation of sharp corners at the juncture of the edges 30 and 31. The step 30ª merges with a similar but somewhat longer transverse edge portion 32 on the outer end of the blade. As shown in Fig. 5, surfaces 33 are ground on each blade to provide proper clearance for the transverse edge portions 31.

The blades are mounted on the cutter body so that the step 30ª will first engage the work as the cutter and work are advanced toward each other. Accordingly, for face milling, the blades extend radially when supported in the slots 24 with the steps 30ª at the outer ends of the blades spaced equidistant from the cutter axis. These and the succeeding steps of all of the blades are preferably disposed throughout their lengths in planes perpendicular to and spaced progressively along the cutter axis and away from the flat end face of the body herein shown.

For convenience, the blade steps will be identified in the description and claims in the order of their engagement with the work during a metal-removing operation, and the perpendicular distances between the planes of adjacent steps will be referred to as the height of the steps. Thus, the edge 30ª, which is the first one of each blade to engage the work, will be referred to as the first step, the edge 30ᵇ as the second step, etc., the final step which removes the last layer of metal being called the last step.

To improve the smoothness of the finished surface, the steps 30ª to 30ʰ or certain of them are formed of different height, decreasing from the outer to the inner or finishing steps so that the higher steps remove metal layers of decreasing thickness, the final layer being extremely thin.

As above set forth, a fundamental characteristic of the present invention is that the chips removed by the individual edge portions 30 are of widths measured in the direction of the cutter feed many times greater than their thickness which is determined by the height of the individual steps. Thus, for operating upon the rough surface of castings and the like, the steps might, for example, be proportioned as shown in the actual size view, Fig. 4, and in the enlarged dimensioned view, Fig. 6, the length of each step being ⅜ of an inch.

To obtain optimum cutting efficiency and long cutter life, it is preferred to employ steps having a maximum height of approximately 0.020 of an inch or even less. In the exemplary cutter shown, the first three steps are of this maximum dimension while the succeeding steps decrease progressively in height, the last or innermost step $30^h$ being .003 of an inch so as to form a very smooth finished surface. A cutter with the blades thus dimensioned would be especially suited for operation upon the rough surfaces of castings, the combined height of the steps being such as to effect removal of a metal layer having an average depth of approximately $\frac{3}{32}$ of an inch. Of course, the proportion of maximum depth steps or the total number of steps may be varied as desired to correspond to thickness of the metal layer to be removed. Likewise the lengths of the individual blade steps, the number of blades, and other characteristics of the cutter may be changed to suit operating conditions, it being apparent that the particular cutter is merely typical of many that might be used.

The steps on all of the blades, when constructed and positioned as above described, cooperate to form a series of overlapping rows or groups of cutting edges each arranged spirally of the cutter face when the cutter is used for face milling.

Thus, the first or outermost edge $30^a$ of each blade cooperates with the successive inwardly spaced edges $30^b$ to $30^h$ of succeeding seven blades to form one spiral row indicated by one of the dot-dash lines in Fig. 3. Since one such spiral group originates with the first step of each blade, the number of groups is equal to the number of blades in the cutter, there being thirty in the present instance. Each spiral row embraces as many blades circumferentially as there are steps on each blade and overlaps the adjacent spiral rows and projects at its ends beyond such rows by the distance between two adjacent blades. By providing such a large number of groups equally spaced around the cutter with the adjacent groups overlapping as indicated by the dot-dash lines in Fig. 3, the number of cuts being taken and the amount of metal being removed by the edges engaging the work in any angular position of the cutter will be substantially constant. Accordingly, the reactionary torque exerted on the cutter is uniform and the cutter is therefore evenly loaded.

By thus grouping the stepped edge portions and forming different steps of different spiral groups integral with each other and on a common radial blade edge, the available face area of the cutter body is utilized to maximum advantage, that is to say, a maximum aggregate length of effective cutting edges is obtained while at the same time providing ample space for chips. Thus, the radially extending slot between any two adjacent blades constitutes a common receptacle for the chips from one edge portion of several spiral groups, such receptacle increasing in width toward its outer end where the chips form in greater volume.

To cause operation of the spiral groups of cutting edges in the manner contemplated by the present invention, the cutter and work are fed relative to each other at a uniform rate such that during each revolution, the cutter is advanced a distance preferably approaching but less than the length of the individual steps $30$ multiplied by the number of blades. With a thirty blade cutter having blades dimensioned as shown, the work might, for example, be advanced approximately eight inches per revolution or a total of over 90 inches per minute using a cutter approximately 30 inches in diameter. Of course, the maximum feed rate may be increased by lengthening the individual steps $30$.

The maximum feed rate employed should always be such that the different steps will enter the work as shown in Fig. 8 and cut chips $35^a$ to $35^h$ (Fig. 9) having ends disposed adjacent but nevertheless separated from each other. At such a rate of feed, the arcuate work zone over which each spiral group of edges passes as a result of the combined rotary and relative feed movements will always overlap the zone traversed by the adjacent preceding group of edges, and the width of the chips will approach the length of the steps $30$ as illustrated in Fig. 9. If the cutter is fed at a slower rate, the widths of the chips will decrease correspondingly. At half the maximum feed rate, for example, chips of the shape and spacing shown in Fig. 10 would be removed by the edges of each blade. Thus, while the rate of feed may vary considerably up to the maximum above referred to, such variations do not vary the thickness of the chips which thickness is determined solely by the height of the individual steps of the cutting edges. The feed rate usually employed will be sufficient to produce chips having widths many times their thickness as determined by the height of the steps. For example, at the maximum feed rate, the chips $35^b$ and $35^c$ formed by the highest steps $30^b$ and $30^c$ would be about fifteen times as wide as thick while in the thinner chips such as $35^g$, the ratio would be even greater. Ordinarily, the width of the thickest chip would be more than four times the thickness of this chip.

Proper correlation of the cutter speed and the feed rate may of course be effected in various ways well known in the art. Thus, the feed mechanism may be actuated through appropriate gearing from the same source of power as the cutter or, as shown herein, the two may be actuated by separate motors capable of operating at substantially constant full load speeds. The proper ratio of feed to cutter speed may be obtained by proportioning the power transmitting connections, suitable means such as pick off gears in the feed mechanism being provided to permit changes in the feed rate.

The machine above described is adapted to face mill surfaces of any width less than the diameter of the circle formed by the innermost ends of the last blade edges $30^h$. Preparatory to the machining operation, the work piece is mounted on the work support with the plane of the innermost blade steps $30^h$ coinciding with the plane of the surface $36$ (Figs. 8 and 11) to be formed. Preferably, the number and height of the steps $30$ are such that with the work thus positioned, the highest portion of the rough surface $37$ will be disposed slightly above the plane of the step $30^a$ as shown in Fig. 8 so that ordinarily this step will not cut to a depth greater than the preferred maximum, that is, 0.020 of an inch. Thus, the transverse edge $32$ will usually cut through the scale on the casting surface, but with sufficient variation in contour of the rough surface, the step 30ᵃ may pass out of contact with the work, the first or even the second transverse edge 31 then cutting through the scale.

During the combined rotary and feeding movements between the work and cutter with the work thus positioned, the successive edges 30ᵃ to 30ʰ of each spiral group move transversely across the work along arcuate paths indicated by the dot-dash lines in Fig. 11 and thus cut from a common zone of the work successive metal layers 40ᵃ to 40ʰ extending parallel to the finished surface 36 which is formed by the last step 30ʰ. Due to correlation of the feed rate and the lengths of the steps 30, the corresponding steps, for example 30ᵃ, of succeeding spiral groups move across zones of the work which overlap in the direction of the feed and remove adjacent layers 40ᵃ from the rough face 37 to form surfaces 39ᵃ. The steps 30ᵃ to 30ᵉ on any one blade remove metal layers 40ᵃ to 40ᵉ simultaneously from adjacent portions of the work to form stepped surfaces 39ᵃ to 39ᵉ spaced longitudinally of the work, the continuous finished surface 36 being formed by the combined action of all of the steps 30ʰ in removing the layers 40ʰ as they traverse the overlapping paths.

Considering the number and lengths of the steps on each blade and the number of blades engaging the work, it will be seen that the aggregate length of the cutting edges acting at any time is relatively large. Because of this coupled with the facts that the chips remain of constant thickness regardless of the rate of feed and the maximum thickness of any chip is well within the range regarded as permissible for use with ordinary cutting materials, the rate of metal removal may be increased many times as compared to present face milling practice. At the same time, substantially finer finishes may be obtained in a single pass across the work and less costly cutting materials may be used without danger of deterioration at an objectionable rate in service.

By constructing the cutting edges as shown with the steps 30ᵃ, 30ᵇ and 30ᶜ disposed in planes parallel to the finished surface, these edges will be required to cut through the thin hard layer of scale on the work surface only in rare instances. This may occur when the contour of the rough surface changes so that the scale layer coincides with the edge 30ᵃ for example. Ordinarily, the scale will be cut by transverse edges 31 or 32 on which no substantial burden is imposed owing to the thinness of the scale layer.

The present invention may be utilized to equal advantage for the purpose of increasing the rate at which finishing cuts may be taken where an extremely fine finish is desired. For this purpose, the cutting edges would be formed with a similar large number of steps 30ᵃ to 30ᶠ of lesser height than in the construction above described. For example, the steps might be dimensioned as shown in Fig. 7, the first steps 30ᵃ and 30ᵇ being a few thousandths of an inch high depending on the thickness of the finishing cut to be taken and the final steps 30ᵉ and 30ᶠ being .0005 and .0003 of an inch respectively. Actual tests show that it is practicable to cut metal layers of such small thickness in accordance with the present invention.

I claim as my invention:

1. A machine for face milling comprising, in combination, a power driven rotary cutter having a plurality of continuous elongated cutting edges extending generally radially of and equally spaced around one axial face of the cutter and each divided longitudinally into a plurality, more than four, of flat steps connected by a plurality of intervening edge portions extending transversely of the steps, the corresponding steps of the different edges being spaced equidistant from, and disposed throughout their lengths in common planes perpendicular to, the cutter axis, said planes being axially spaced apart by decreasing increments beginning with the outermost steps and the longitudinal length of the individual steps being more than four times the height thereof, means for supporting a work piece and said cutter for relative bodily movement transversely of the cutter axis with the plane of the innermost steps coinciding with the surface to be produced, and power driven mechanism correlated with the rotation of the cutter and operable to relatively feed the cutter and work during each revolution of the cutter a distance several times greater than the widest of said increments multiplied by the number of said edges but less than the longitudinal length of each step multiplied by the number of edges.

2. A machine for face milling comprising, in combination, work and tool supports mounted for relative feeding movement parallel to a work surface to be formed, a power driven rotary cutter mounted on said tool support with its axis perpendicular to said surface, a plurality of elongated radially extending cutting edges on the cutter face each divided longitudinally into five or more steps with the innermost steps disposed in the plane of the finished work surface and the other steps spaced toward the cutter variably increasing distances substantially less than the lengths of said steps, and power driven mechanism operating to effect relative feeding movement between said supports at a rate such that the chip cut by each of said steps is wider in the direction of feed than thick due to the height of the step cutting the chip.

3. A machine for face milling comprising, in combination, a power driven rotary cutter having a plurality of blades extending generally radially of the cutter face, cutting edges on said blades each divided longitudinally into a plurality of stepped portions, each having a radial length several times the axial distance between adjacent portions, the corresponding portions of the different blades being disposed equidistant from the cutter axis and the outermost steps of each blade and the successive inwardly spaced portions of the succeeding blades of a group equal to the number of portions on each blade cooperating to form a spiral set of cutting edge portions spaced increasing axial distances away from a point on the cutter face, means for supporting a work piece with the innermost edge portions coinciding with the plane of the work surface to be formed, and a power operated mechanism for relatively feeding said cutter to advance the portions of each spiral set across a common zone of the work piece whereby to remove metal therefrom in successive layers of substantially greater width than thickness.

4. A machine for face milling comprising, in combination, a power driven rotary cutter having a plurality of blades extending generally radially of the cutter face, cutting edges on said blades each divided longitudinally into a plurality, more than four, of spaced steps connected at adjacent ends by a plurality of transversely extending edge portions, the outermost steps of each blade and the successive inwardly spaced steps of the succeeding blades cooperating to form a spiral group of cutting edges spaced increasing axial distances away from the cutter face, the innermost steps of said groups terminating in a common plane and the effective radial length of the individual steps being several times greater than the height thereof, means for supporting a work piece with said plane coinciding with the plane of the work surface to be formed, and a power operated mechanism for relatively feeding said cutter and work piece at a rate such as to cause the steps of the respective spiral groups to remove metal from adjacent overlapping zones of the work piece in successive thin layers substantially parallel to said plane and of substantially greater width in the direction of feed than in thickness.

5. A machine for face milling comprising, in combination, work and tool supports mounted for relative feeding movement parallel to a work surface to be formed, a power driven rotary cutter body mounted on said tool support with its axis perpendicular to said surface, a plurality of elongated cutting edges on one end of said body extending generally radially and each divided into a plurality of steps of substantially greater individual radial length than axial height and with the innermost steps disposed throughout their lengths in the plane of the finished work surface, each of said steps having an individual axial height of such small magnitude that the cutter and work piece may be relatively fed at a rate per cutting edge approaching the individual length of the steps without increasing the thickness of the metal slices removed, and power driven mechanism operating to effect relative feeding movement between said supports at such a rapid rate that a continuous smooth work surface is formed and each of said steps cuts a slice of metal having a width measured longitudinally of said plane several times as great as the thickness of the layer normal to the plane.

6. A metal working machine comprising, in combination, a power driven rotary cutter having a plurality of elongated cutting edges disposed equidistant from the cutter body and each divided longitudinally into a succession of at least four spaced steps disposed parallel to the work surface to be formed and each having a length several times its height, the height of the individual steps decreasing in a direction from the first to the last step to engage the work, transversely extending cutting edge portions connecting the adjacent ends of adjacent steps, means for supporting a work piece and said cutter for relative bodily movement with said last steps coinciding with the surface to be produced, and power driven mechanism for relatively feeding the cutter and work such a rapid rate that each of said steps removes a layer of material of substantially greater width in the direction of the feed than of thickness due to the height of the individual steps and said last steps form a continuous smooth surface on the work.

7. A metal working machine comprising, in combination, a power driven rotary cutter having a plurality of elongated cutting edges disposed equidistant from the cutter body and each divided longitudinally into a succession, more than four, of steps disposed parallel to the work surface to be formed and joined at adjacent ends by transverse edge portions, each of said steps having a length more than four times its height, means for supporting a work piece and said cutter for relative bodily movement with the last work engaging steps coinciding with the surface to be produced, and power driven mechanism for relatively feeding the work and cutter during each revolution of the latter a distance several times greater than the height of any step multiplied by the number of said edges but less than the longitudinal lengths of the individual steps multiplied by the number of edges.

8. The method of face milling a work piece which comprises providing on a rotatable support a series of generally radial cutter blades each having a series of individual cutting edges progressively stepped for successive work engagement and each edge having greater length than axial height, arranging said edges to form a plurality of spiral overlapping groups each comprising the outermost individual cutting edge on one blade and the progressively inward individual edges on succeeding blades, positioning said work piece with the plane of the innermost individual edges coinciding with the work surface to be formed, rotating said support, and simultaneously effecting relative feeding movement between said support and said work piece longitudinally of said plane to cause the edges of adjacent spiral groups to traverse overlapping curved zones on the work piece and the edges of the individual groups to remove from the respective zones successive layers of metal which are much longer in the direction of the feed than they are thick in a perpendicular direction.

9. The method of metal working which comprises subjecting the surface portion of a work piece to the actions of a plurality of generally radial rotating cutting edges each comprising longitudinally spaced portions stepped for successive engagement with the work and having greater individual length in a direction normal to the rotational axis than in height, and relatively feeding the work piece and said edges at a continuous rate such as to cause spiral groups of said edge portions each comprising the successive inwardly spaced edge portions of successive blades to cut from overlapping arcuate zones of the work respective successions of metal layers each having greater width in the direction of feed than in thickness whereby to leave a continuous smooth surface formed by the innermost of said edge portions.

10. The method of face milling a metallic work piece which comprises rotating a cutter head having a plurality of approximately radial blades each provided with a plurality of individual cutting edges lying respectively in planes normal to the axis of the cutter and axially spaced decreasing distances apart toward the head, and causing relative movement between the work piece and said rotating head to traverse across a common zone of the work piece the outermost edge on one blade and the successive inwardly spaced edges of succeeding blades whereby to remove from such zone successive metal layers of decreasing individual thickness and of individual width in the direction of feed more than four times the thickness.

11. The method of face milling a metallic work piece which comprises rotating a cutter head having a plurality of approximately radial blades each provided with a plurality of individual cutting edges lying respectively in spaced planes which extend normal to the axis of the cutter, and causing relative movement between the work piece and said rotating head to traverse the successive inwardly spaced edges of successive blades across a common curved zone of the work piece at a rate such that the successive edges of each group remove successive metal layers of greater width in the direction of said movement than thickness due to the spacing of said planes.

12. The method of metal working which comprises subjecting the surface portion of a work piece to the actions of a plurality of annularly spaced rotating cutting edges each divided into parallel steps for successive engagement with the work having greater individual length than height, and relatively feeding the work piece and said edges at a continuous rate such as to cause the first steps of successive blades to cut from overlapping zones of the work metal layers of greater width in the direction of feed than in thickness, the successive steps of succeeding blades coacting with each of said first steps to remove successive layers of similar proportions from said zones whereby to leave a continuous smooth surface.

13. For use in a cutter adapted to form a smooth surface on a work piece when rotated and relatively fed in a direction parallel to said surface, a cutter blade comprising a block of generally rectangular shape having a short transverse cutting edge portion and a long continuous longitudinal cutting edge merging therewith and divided into a plurality, more than four, of straight longitudinally spaced steps with additional transverse cutting edge portions connecting the adjacent ends of the adjacent steps, each of said steps having a height not exceeding .020 of an inch and being of a length at least ten times greater than height, and the height of the steps decreasing in a plurality of stages along said longitudinal edge in a direction away from said short edge portion.

14. The method of face milling a metallic work piece which comprises revolving a series of generally radial cutting edges arranged in a plurality of substantially radially extending steps and the successively acting inwardly spaced steps of each group disposed in axially separated planes spaced apart distances equal to a small fraction of the individual length of the steps, supporting a work piece with the plane of the innermost one of said steps coinciding with the final work surface to be produced, and moving the work piece and the revolving edges bodily relative to each other and longitudinally of said planes at a rate such as to advance the successive inwardly spaced steps of successive edges across a common zone of the work and cause removal therefrom of successive metal layers each having a width in the direction of the feed several times as great as the thickness in a perpendicular direction.

15. The method of removing metal to form a continuous surface on a work piece which comprises revolving a plurality of sets of cutting edges about a common axis with the edges of the respective sets arranged in overlapping spiral formations and the edges of each set adapted for the removal of thin metal slices progressing from the rough surface to the final work surface and disposed generally parallel thereto, and relatively feeding the work and said series of cutting edges longitudinally of said final surface at a rate such as to advance the spiral sets of edges successively across progressively advancing zones of the work and cause each edge of one of said sets to remove from one of said zones a metal slice of a width in the direction of the feed several times as great as the thickness in a perpendicular direction.

16. The method of removing metal to form a plane surface on a work piece which comprises revolving a series of cutting edges about a common axis perpendicular to said surface with the edges arranged to produce a substantially uniform cutting torque in all angular positions of the edges and to remove thin metal slices progressing from the rough surface to the final work surface and disposed generally parallel thereto, and relatively feeding the work and said series of cutting edges longitudinally of said final surface at a rate such as to advance the spiral sets of edges successively across progressively advancing overlapping zones of the work and cause the edges of each set to remove from one of said zones metal slices each having a width in the direction of the feed several times as great as the thickness in a perpendicular direction.

17. A machine for removing metal from a work piece to form a plane surface thereon comprising, in combination, a cutter head having a series of generally radial cutting edges projecting from one end thereof and each divided longitudinally into a plurality of steps each adapted to cut a thin slice of metal disposed in a plane approximately parallel to the plane of the desired final surface, the outermost step of each cutting edge and the successive inwardly spaced steps of successive edges being positioned progressively along the cutter axis and also in a spiral row which embraces as many edges as there are steps on each individual edge and overlaps a plurality of adjacent spiral rows, means for rotating said cutter, and means for causing relative feeding movement between said cutter and a piece of work in a direction parallel to the final surface to cause the overlapping spiral sets of steps to remove from progressive zones of the work successive slices of metal of substantially greater width in the direction of the feed than thickness in a perpendicular direction.

18. A machine for removing metal from a work piece to form a continuous surface thereon comprising, in combination, a cutter head having a series of cutting edges arranged in a plurality of circumferentially overlaping spiral sets and each adapted to cut a thin slice of metal disposed generally parallel to the desired final surface, the successively acting edges of each spiral set progressing toward said final surface, means for rotating said cutter, and means for causing relative feeding movement between said cutter and a piece of work in a direction parallel to the final surface to cause each overlapping spiral set of steps to remove from a common zone of the work successive slices of metal of substantially greater width in the direction of the feed than thickness in a perpendicular direction.

19. A machine for removing a layer of metal from a work piece having, in combination, an annular series of blades each having a large number of stepped cutting edges disposed in planes generally perpendicular to and spaced along the axis of rotation of the blades, the steps on successive blades being arranged in a series of spiral rows equal in number to the number of blades and each row overlapping the adjacent rows substantially throughout the major portion of its length, means for rotating said series of blades, and means for relatively feeding the work piece and said series of rotating blades along a path of cutting engagement.

20. A method of removing metal from a work piece, which comprises rotating about an axis a series of generally radial blades each having a plurality of stepped cutting edges lying in planes approximately normal to said axis, with the successive annular series of edges in corresponding steps, from the outermost step inward, lying in individual planes progressively spaced along said axis and disposed in common annular zones of progressively smaller radius, and with the inwardly successive edges in the successive blades of a group arranged in spiral rows overlapping each other circumferentially, and causing relative feed between said series of blades and the work piece in a direction normal to said axis and at such a rate as to cause the successive cutting edges of any individual spiral row to remove progressively thin layers of metal from a comon zone of the work piece.

21. A cutter for forming a smooth surface on a work piece when the cutter is rotated and is relatively fed in a direction parallel to said surface, said cutter comprising a body adapted for rotation about a central axis, a plurality of blades projecting from said body and having cutting edges each divided longitudinally into five or more steps, of which all except the final step are of equal length, said steps being less than twenty thousandths of an inch in height and decreasing in height from the first to final steps, the length of each step being more than ten times the spacing between any two adjacent steps, the end step of each blade and the successive longitudinally spaced steps of successive blades being arranged in a spiral row which embraces as many blades circumferentially as there are steps on each individual blade, whereby each row overlaps the two adjacent rows and projects at its ends beyond such rows by the distance between two adjacent blades.

22. A cutter for removing a layer of metal from a work piece to form a smooth surface thereon by relative feeding movement between the cutter and the work piece parallel to said surface, said cutter comprising a rotary body, and a plurality of angularly spaced blades thereon having elongated cutting edges divided longitudinally into a series of steps disposed generally parallel to the intended direction of feed of the cutter, the first work engaging step of each blade and the successive longitudinally spaced steps of successive blades being arranged in a spiral helical row which overlaps the two adjacent rows and embraces as many blades circumferentially as there are steps on each individual blade, the height of the individual steps being so small that the cutter may be relatively fed in a direction longitudinally of said edges at a rate per blade approaching the length of each step without increasing the thickness of the metal slices removed by the respective steps.

23. A cutter for forming a smooth surface on a work piece when the cutter is rotated and is relatively fed in a direction parallel to said surface, said cutter comprising a body adapted for rotation about a central axis, a plurality of blades projecting from one end face of said body and having generally radial cutting edges each divided longitudinally into at least four steps lying in planes approximately perpendicular to said axis, the spacing between each two adjacent planes being so small that the cutter and work piece may be relatively fed at a rate per blade approaching the length of the individual steps without increasing the thickness of the chips removed.

24. A cutter for forming a smooth surface on a work piece when the cutter is rotated and is relatively fed in a direction parallel to said surface, said cutter comprising a body adapted for rotation about a central axis, a plurality of blades projecting from one end face of said body and having generally radial cutting edges each divided longitudinally into four or more steps lying in planes approximately perpendicular to said axis and having individual lengths more than ten times their individual heights, the outermost step of each blade and the successive inwardly spaced steps of successive blades being arranged in a spiral row which embraces as many blades circumferentially as there are steps on each individual blade, whereby each spiral row overlaps the two adjacent rows and projects at its ends beyond such rows by the distance between two adjacent blades.

25. A cutter for forming a smooth surface on a work piece when the cutter is rotated and is relatively fed in a direction parallel to said surface, said cutter comprising a body adapted for rotation about a central axis, a series of blades projecting from said body and having cutting edges each divided longitudinally into five or more steps, the steps on the series of blades being circumferentially arranged in a spiral row which embraces at least as many blades as there are steps on an individual blade, and the spacing of the adjacent steps in said spiral row being of such small magnitude that the cutter may be relatively fed at a rate per blade approaching the length of each step without increasing the thickness of the metal slices removed by said steps.

26. A machine for removing a layer of metal from a work piece, comprising, in combination, a cutter head carrying a series of blades each having a large number of stepped cutting edges, the edges on the series of blades being arranged in a plurality of overlapping spiral helical rows, means for rotating said cutter, and means for relatively feeding the work piece and said cutter along a path of cutting engagement.

CHARLES EDWARD KRAUS.